May 1, 1934.  A. O. HURXTHAL ET AL  1,957,343
TOASTER
Filed July 24, 1930   2 Sheets-Sheet 1

Inventors:
Alpheus O. Hurxthal
George M. Biddinger
by their Attorneys
Howson & Howson May 1, 1934.  A. O. HURXTHAL ET AL  1,957,343
TOASTER
Filed July 24, 1930   2 Sheets-Sheet 2

Inventors:
Alpheus O. Hurxthal
George M. Biddinger
by their Attorneys
Howson & Howson Patented May 1, 1934

1,957,343

UNITED STATES PATENT OFFICE 1,957,343

TOASTER

Alpheus O. Hurxthal and George M. Biddinger, Philadelphia, Pa., assignors to Proctor & Schwartz Electric Company, Philadelphia, Pa., a corporation of Pennsylvania Application July 24, 1930, Serial No. 470,456

6 Claims. (Cl. 219—19)

This invention relates primarily to ways and means for supporting a thermo-sensitive element in a temperature-controlling apparatus, so as to obtain and maintain a firm but yieldable intimate contact between the thermo-sensitive element and the surface of the material being treated in the device in which the temperature-controlling apparatus is installed, for attaining the greatest possible accuracy and efficiency in the operation of the device.

A more specific application of the present invention resides in the installation of the apparatus in the lid or other upper movable section of a toaster.

Prior to this invention it has been customary to rigidly secure a thermo-sensitive element in the lid of the toaster, consequently when a slice of bread was placed in the toaster and the lid closed thereon the weight of the entire lid and the apparatus carried thereby was supported by the thermo-sensitive element as it rested on the bread.

If the bread were very fresh and soft the thermo-sensitive element would be so deeply imbedded in the bread that the thermo-sensitive element would not function efficiently to shut off the heat or to actuate the signal denoting that the bread had been toasted to the extent desired or to the shade of color desired, thus the color of the toast would be a much deeper shade than desired before the thermo-sensitive element would become effective.

In the case of a very dry slice of bread being placed in the toaster the thermo-sensitive element would ride high and operate prematurely, thus producing a much lighter shade of toast than desired, for the same setting of the device as had produced the above noted darker shade of toast.

If the surface of the slice of bread placed in the toaster were concaved or uneven the thermo-sensitive element would make poor contact with the surface of the bread, consequently the result obtained would not be uniform, in some instances producing dark toast and in other instances, for the same setting, producing light toast.

The object of the present invention is to mount the thermo-sensitive element for universal movement relative to the toaster so that it will rest on and in firm intimate yieldable contact with the surface of the material being toasted and will accommodate itself to any angle, concavity, or irregularity of the surface on which it rests; and that it will support substantially only its own weight, so as not to be pressed into the material being toasted, heated or otherwise treated.

The construction and operation of the device will be more fully disclosed hereinafter, reference being had to the accompanying drawings, of which:

Figure 1:
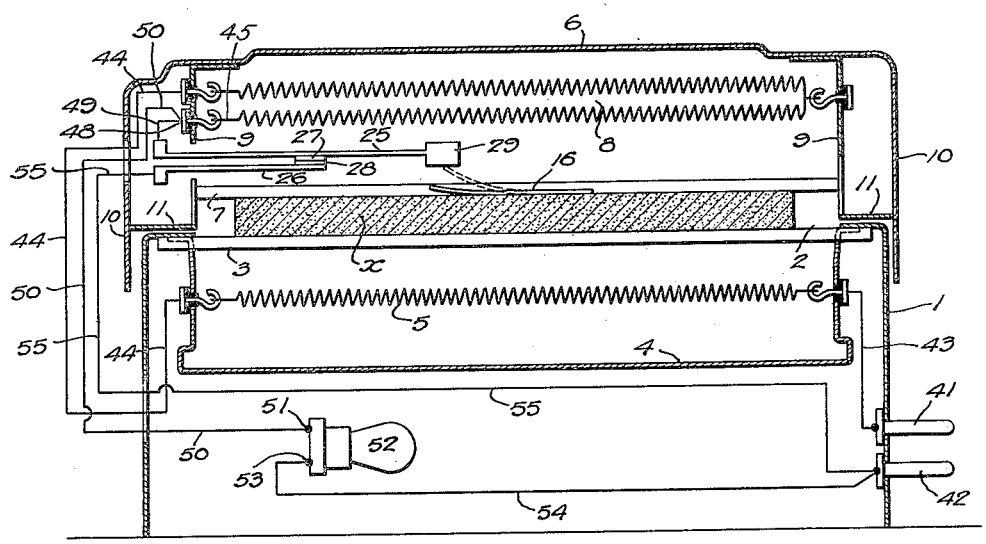
Fig. 1 is a diagrammatic sectional elevation of a toaster showing the general arrangement of the thermo-sensitive element, the heating elements and the electric circuit to which the invention is applied.
Figure 4:
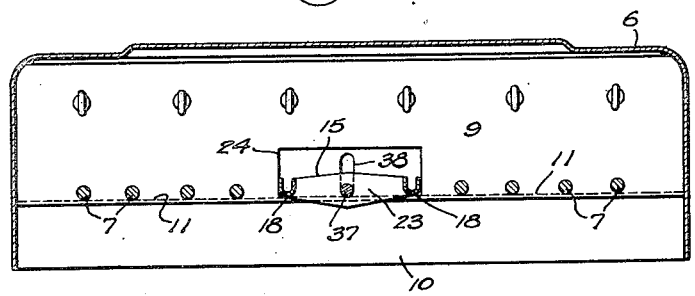
Fig. 4 is a sectional elevation taken on the line 4—4, Fig. 2.
Figure 2:
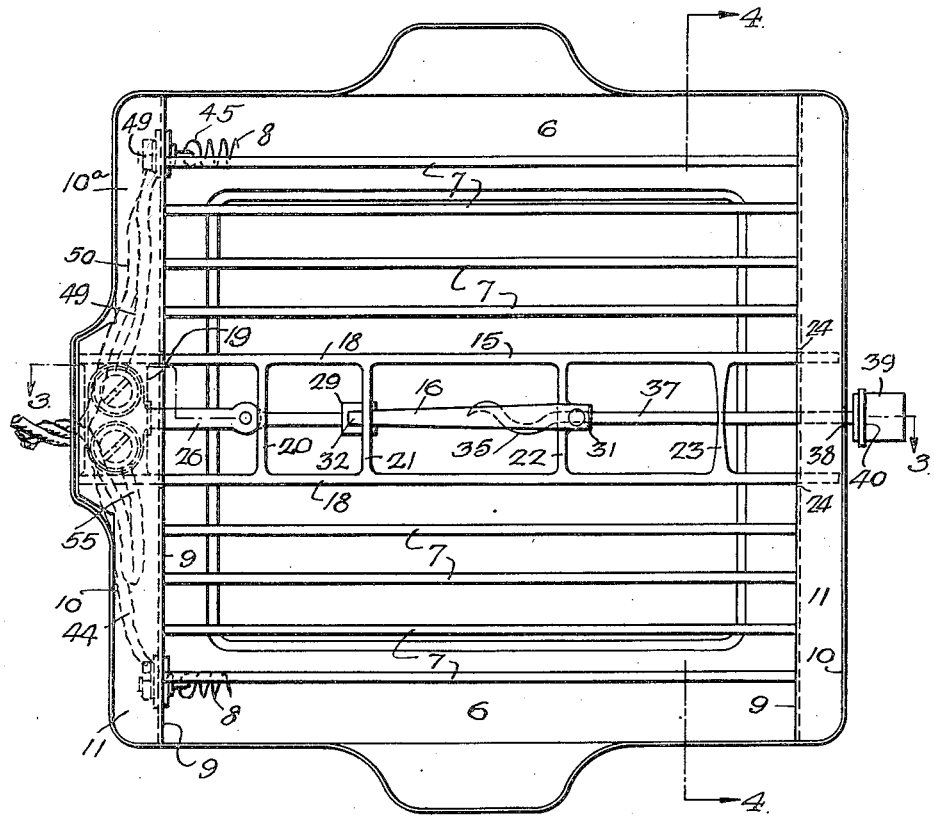
Fig. 2 is an inverted plan view of the lid of the toaster, showing the floating supports for the thermo-sensitive element and the electric switch controlled thereby.
Figure 3:
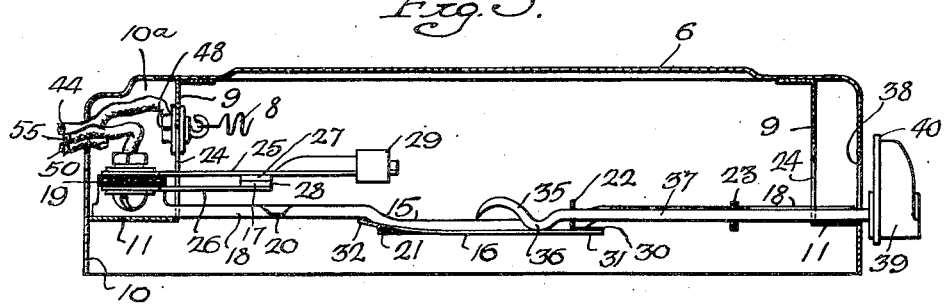
Fig. 3 is a sectional elevation taken on the line 3—3, Fig. 2.

In Fig. 1 of the drawings, 1 indicates the base of the toaster, having an open top 2 provided with an open grid 3 for supporting a slice of bread or other material $x$ to be toasted. Below the grid 3 is disposed an open topped pan 4, in and extending across which is suspended a heating element 5.

The lid or other upper section 6 of the toaster is hinged to or otherwise mounted on the base 1 in a manner to accommodate material of various thicknesses or of uneven thickness, grid bars 7, 7 extending across the lid 6 and adapted to rest on the upper surface of the material $x$.

A heating element 8 is disposed in and extends across the lid 6, above the grid bars 7, 7, said heating element being supported at its opposite ends by walls or partitions 9, 9 spaced inwardly from and extending substantially parallel to the side walls 10, 10 of the lid 6, the space between the sides 10 and the partitions 9 at the open side of the lid 6 being closed by plates 11, 11.

Extending across the lid 6 intermediate the sides 10, 10 thereof and substantially parallel to the grid bars 7, 7 is a floating frame 15, which carries and supports the thermosensitive element 16 and the electric switch 17 controlled thereby.

The floating frame 15 in the present instance comprises a pair of substantially parallel side bars 18, 18 connected at one end by a plate section 19 and at spaced intervals throughout the length of the frame by cross bars 20, 21, 22 and 23.

The partitions 9, 9 are recessed as at 24 for the reception of the opposite ends of the floating frame 15, to permit universal movement of the frame in and relative to the toaster lid 6. The frame 15 assumes at all times a substantially horizontal plane, and is free to move upwardly and downwardly or at an angle with respect to the grid bars 7 to accommodate the thermo-sensitive element 16 to the surface of the material on which the thermo-sensitive element is to rest. The plates 11, 11 retain the floating frame 15 within the lid 6.

The plate section 19 of the floating frame 15 has secured thereto a pair of resilient switch elements 25 and 26 respectively. These elements extend longitudinally of the frame 15 through the center thereof, the element 25 which constitutes the movable element of the switch extending beyond the end of the relatively fixed element 26. The movable switch element 25 is provided with a contact 27 and the fixed element 26 is provided with a co-acting contact 28.

Adjacent the outer end of the movable switch element 25 is a sleeve 29 composed of any suitable insulating material, such as lava, for purposes hereinafter set forth.

The cross bar 22 is provided with a flange or lug 30 to which is rigidly secured one end 31 of the thermo-sensitive element 16, which extends longitudinally through the center of the frame 15 and bends upwardly over and rests at its free end 32 on the cross bar 21.

The thermo-sensitive element in the present instance comprises a bi-metallic strip consisting of two parallel and integrally united strips of metal having different coefficients of expansion, which when the unified strip becomes heated to various temperatures warps or curls up at its free end to such an extent that the free end 32 of the strip engages the insulating sleeve 29 of the movable switch element 25 which flexes the element 25 upwardly and disengages the contact 27 from the contact 28, carried by the relatively fixed switch element 26.

In order to control the thermo-sensitive element 16 to function at various desired temperatures to produce, for example, toast of a desired shade, i. e. pale, medium or dark, or any intermediate shade, an abutment 35 is provided which bears on the upper side of the bi-metallic strip 16, the abutting point 36 being movable longitudinally of the strip 16 intermediate the opposite ends thereof.

For the purpose of moving the abutting point along the strip 16, the abutment 35 is made in the form of a cork screw, i. e. a spirally twisted bar, which when rotated causes the point 36, which contacts with the upper surface of the bi-metallic strip 16, to travel in one or the other direction along the strip depending upon the direction in which the abutment is rotated.

The body portion 37 of the abutment bar 35 is in the form of a spindle which is rotatably mounted in the cross bars 22 and 23 of the floating frame 15 and extends through a slot 38, formed in one of the side walls 10 of the lid 6, to the outside of the toaster where it is equipped with an operating knob or handle 39 having a pointer 40 adapted to be moved over a calibrated scale or other indicating means, for lighter or darker toasting, on the side wall 10 adjacent the pointer 40.

It will here be noted that the nearest the abutting point 36 is located with respect to the fixed end 31 of the bi-metallic strip 16, the lower the temperature will be at which the free end 32 of the strip 16 will flex sufficiently to unseat the contact 27, and the closer to the free end 32 of the strip the abutting point 36 is moved the higher the temperature that will be required to flex the free end of the strip 16 into engagement with the sleeve 29 of the movable switch element 25 to unseat the contact 27 from the contact 28. Thus the thermo-sensitive element 16 is controlled for automatically producing toast of any desired shade.

It is to be noted that the thermo-sensitive element is disposed in a plane below but substantially parallel to the floating frame 15, so that the said thermo-sensitive element will at all times seat itself on the surface of the material to be toasted and will universally accommodate itself to any irregularities in said surface without interference from the floating frame 15 in which it is carried.

The frame 15 is preferably pressed from a sheet of light metal, for example, aluminum, to reduce its weight so that the thermo-sensitive element will at no time be pressed into the material being treated. Also for this reason the frame 15 is arranged to slide vertically in the partitions 9, 9 of the lid 6, the slots or recesses 24, 24 therein permitting this vertical or universal movement of the floating frame 15 relative to the lid 6.

The electric circuit, as illustrated in Fig. 1, includes outside terminals 41 and 42, one of which is connected directly to one end of the heating element 5 by a wire 43. The heating element 5 is connected in series by a wire 44 to one end of the heating element 8, the opposite end 45 of the heating element 8 being connected by a wire 49 to the movable switch element 25 and by a wire 50 to one side 51 of a signal 52 which functions also as a resistor for the current passing to the heating elements 5—8, it being noted that the other side 53 of the resistor 52 is coupled by a wire 54 to the second outside terminal 42.

The outside terminal 42 is also connected by a wire 55 to the relatively fixed contact support 26, thereby forming with the contacts 28 and 27, the movable switch element 25 and the wire 49, a shunt around the resistor 52 so that when the contacts 27 and 28 are in engagement with each other the current flows to the heating elements 5—8 through the shunt around the resistor 52, thus the signal furnished by this resistor receives practically no current and is therefore ineffective.

When the thermo-sensitive element 16 functions to disengage the contact 27 from the contact 28 the shunt circuit is opened, requiring the current to pass through the resistor 52 to reach the heating coils 5—8, consequently the amount of current reaching the heating coils is reduced to such an extent that they become ineffective and at the same time the resistor-signal becomes effective to indicate that the flow of current to the heating coils has been reduced, which to the operator indicates that the toast has attained the shade desired.

This circuit is covered in a co-pending application filed in the name of George M. Biddinger, under date of July 15, 1930, Serial No. 468,097.

To permit free universal movement of the frame 15 the electric wires 49 and 55 comprise flexible cable sections 49a and 55a which lie within and extend longitudinally through the chamber 10a at one end of the frame 15 so as to cause no restriction to the free movement of the frame.

We claim:

1. In a toaster comprising a base section and a top section arranged to receive material to be toasted in a substantially horizontal plane therebetween, the combination of a thermo-sensitive element arranged to engage the upper surface of the material, a supporting frame for said thermo-sensitive element loosely mounted in the top section of said toaster permitting said thermo-sensitive element to accommodate itself to the upper surface of the material, an electric heating circuit in said toaster, and a switch for controlling said circuit actuatable by said thermo-sensitive element and carried by said loosely mounted frame.

2. In a toaster comprising a base section and a top section arranged to receive material to be toasted in a substantially horizontal plane therebetween, the combination of a thermo-sensitive element comprising a bi-metallic strip arranged to engage the upper surface of the material being toasted, a supporting frame for said strip loosely mounted in the top section of the toaster to permit the strip to lie flat on the said upper surface of the material, one end of said strip being rigidly secured to the said loosely mounted frame, an electric circuit in the toaster, and a controlling switch for said circuit carried on said loosely mounted frame adjacent the free end of said bi-metallic strip and arranged to be actuated thereby.

3. In a toaster comprising a base section and a top section arranged to receive material to be toasted in a substantially horizontal plane therebetween, the combination of a thermo-sensitive element comprising a bi-metallic strip arranged to engage the upper surface of the material being toasted, a supporting frame for said strip loosely mounted in the top section of the toaster to permit the strip to lie flat on the said upper surface of the material, one end of said strip being rigidly secured to the said loosely mounted frame, an electric circuit in the toaster, a controling switch for said circuit carried on said loosely mounted frame adjacent the free end of said bi-metallic strip and arranged to be actuated thereby, and regulating means for said strip carried by said loosely mounted frame.

4. In a toaster comprising a base section and a top section arranged to receive material to be toasted in a substantially horizontal plane therebetween, the combination of a thermo-sensitive element comprising a bi-metallic strip arranged to engage the upper surface of the material being toasted, a supporting frame for said strip loosely mounted in the top section of the toaster to permit the strip to lie flat on the said upper surface of the material, one end of said strip being rigidly secured to the said loosely mounted frame, an electric circuit in the toaster, a controlling switch for said circuit carried on said loosely mounted frame adjacent the free end of said bi-metallic strip and arranged to be actuated thereby, regulating means for said strip carried by said loosely mounted frame and extending outside said toaster, and an operating handle on said regulator outside said toaster.

5. In a toaster comprising a base section and a top section arranged to receive material to be toasted in a substantially horizontal plane therebetween, the combination of a thermo-sensitive element comprising a bi-metallic strip arranged to engage the upper surface of the material being toasted, a supporting frame for said strip loosely mounted in the top section of the toaster to permit the strip to lie flat on the said upper surface of the material, one end of said strip being rigidly secured to the said loosely mounted frame, an electric circuit in the toaster, a controlling switch for said circuit carried on said loosely mounted frame adjacent the free end of said bi-metallic strip and arranged to be actuated thereby, and an abutment carried by said loosely mounted frame and engaging said strip intermediate its ends for regulating the actuation of said strip.

6. In a toaster comprising a base section and a top section arranged to receive material to be toasted in a substantially horizontal plane therebetween, the combination of a thermo-sensitive element comprising a bi-metallic strip arranged to engage the upper surface of the material being toasted, a supporting frame for said strip loosely mounted in the top section of the toaster to permit the strip to lie flat on the said upper surface of the material, one end of said strip being rigidly secured to the said loosely mounted frame, an electric circuit in the toaster, a controlling switch for said circuit carried on said loosely mounted frame adjacent the free end of said bi-metallic strip and arranged to be actuated thereby, an abutment carried by said loosely mounted frame and engaging said strip intermediate its ends, and means carried by said frame and operable from outside said toaster for moving the contact point of said abutment longitudinally of said strip for regulating the actuation of said strip.

ALPHEUS O. HURXTHAL.
GEO. M. BIDDINGER.